United States Patent [19]
DeSurvire et al.

[11] Patent Number: 6,134,038
[45] Date of Patent: Oct. 17, 2000

[54] OPTICAL SIGNAL FOR A SOLITON OPTICAL TRANSMISSION SYSTEM

[75] Inventors: Emmanuel DeSurvire, Bruyeres-le-Chatel; Olivier LeClerc, Savigny-sur-Orge, both of France

[73] Assignee: Alcatel, Paris, France

[21] Appl. No.: 08/954,096

[22] Filed: Oct. 20, 1997

[30] Foreign Application Priority Data

Oct. 21, 1996 [FR] France ................................. 96 12746

[51] Int. Cl.⁷ ..................................... H04B 10/04
[52] U.S. Cl. .............................. 359/188; 359/158
[58] Field of Search ................... 359/158, 161, 359/173, 188

[56] References Cited

U.S. PATENT DOCUMENTS 5,737,110   4/1998   Suzuki et al. ............................ 359/161

FOREIGN PATENT DOCUMENTS

WO9207430   4/1992   WIPO .
WO9504952   2/1995   WIPO .

OTHER PUBLICATIONS

R. Jin, "Coompression of Bright Optical Pulses by Dark Solitons", *Optics Letters*, vol. 18, No. 7, Apr. 1, 1993, pp. 494–496, XP000367915.

Patent Abstracts of Japan, vol. 015, No. 495 (P–1288) Dec. 13, 1991 corresponding to JP 03 214123 A (Nippon Telegr & Telph Corp) dated Sep. 19, 1991.

*Primary Examiner*—Kinfe-Michael Negash
*Attorney, Agent, or Firm*—Sughrue, Mion, Zinn Macpeak & Seas, PLLC

[57] ABSTRACT

In a soliton transmission system, the invention proposes sending a signal constituted by a periodic series of solitons, each having a width lying in the range 0.20 times to 0.33 times the period of the signal. In such a signal, interaction between the solitons compensates the jitter caused by the Gordon-Haus effect. A signal is thus obtained that can be used as a clock, having an amplitude or a time Q-factor $Q_a$ or $Q_t$ that is high, over large distances z.

14 Claims, 2 Drawing Sheets

OPTICAL SIGNAL FOR A SOLITON OPTICAL TRANSMISSION SYSTEM

The present invention relates to an optical signal for a soliton optical transmission system, and to an optical clock formed by such a signal. The invention also relates to a method of generating an optical clock signal in an optical data transmission system, and to an optical transmission system including such a clock signal.

BACKGROUND OF THE INVENTION

The transmission of soliton pulses or "solitons" in the portion of an optical fiber that has abnormal dispersion is a known phenomenon. The transmission of so-called "black" solitons constituted by pulse "holes" in a continuous signal, in the normal dispersion portion of an optical fiber is also known; in this case, the solitons have a wavelength such as to propagate with negative chromatic dispersion. Both for "white" solitons and for "black" solitons, to compensate dispersion of the optical signal, use is made of the non-linearity in the corresponding portion of the fiber. Soliton transmission is modelled in known manner by the non-linear Schrödinger equation.

Various effects limit the transmission of such pulses, such as jitter induced by solitons interacting with the noise present in the transmission system, e.g. as described in the article by J. P. Gordon and H. A. Haus, published in Optical Letters, Vol. 11, No. 10, pp. 665–667. This effect, known as the Gordon-Haus effect, puts a theoretical limit on the quality or the bit rate of transmission by means of solitons.

Because of the deformations induced on solitons during transmission, and in particular because of the jitter induced by the Gordon-Haus effect, considerable efforts are needed to ensure that a signal encoded by solitons is transmitted, and to make it possible to recover the necessary clock frequency from pseudo-random signals. Thus, sliding guiding filter systems have been proposed that enable the jitter of transmitted solitons to be controlled, as have various clock recovery systems, both optical and optoelectronic. Such systems are relatively expensive and complex, in particular because of the need to eliminate the effects of jitter before recovering the clock. An example of such a clock recovery system is described in FR-A-2 706 710.

As described by F. M. Mitschke and L. F. Mollenauer, Optical Letters, Vol. 12, No. 5, pp. 355–357, adjacent solitons interact. This interaction appears as attraction between adjacent solitons in the absence of modulation, i.e. for solitons that are in phase. It appears as repulsion between adjacent solitons when they are in phase opposition.

This interaction is generally considered as being a harmful phenomenon since it leads to deformation of transmitted solitons that can lead to loss of information, see for example N. J. Smith et al., Optical Letters, Vol. 19, No. 1, pp. 16–18, which presents such interaction as "one of the major constraints in the design of soliton optical fiber communications systems". In the prior art, proposals have been made to avoid this interaction by imposing a constraint on the time "distance" between two transmitted solitons, thereby limiting the effects of interaction between solitons. A commonly accepted value for the minimum separation between two solitons is $0.2 \times Dt$ where $Dt$ is the width of the solitons, conventionally defined by energy being equal to half the maximum energy, and known as "full width at half maximum" (FWHM).

OBJECTS AND SUMMARY OF THE INVENTION

The present invention proposes an original and simple solution to the problem of transmitting a clock in a soliton transmission system. The invention makes it possible to simplify transmission of a clock in a transmission system, in particular by overcoming the jitter caused by the Gordon-Haus effect.

More precisely, the invention proposes an optical signal constituted by a periodic series of solitons, each having a time width lying in the range 0.20 times to 0.33 times the period of the signal.

In one embodiment, the solitons are black solitons.

Adjacent solitons can be in phase or in phase opposition. If they are in phase opposition, the period of the power envelope is taken into consideration independently of the changes of sign in the field.

The invention also provides an optical clock formed by such an optical signal.

The invention also provides an optical data transmission system comprising such an optical signal or such an optical clock.

Finally, the invention proposes a method of generating an optical clock signal in an optical data transmission system, comprising emitting a periodic series of solitons, each having a time width lying in the range 0.20 times to 0.33 times the period of the signal.

In an implementation, the solitons are black solitons.

The method may also include O-p modulation of the emitted solitons.

In an implementation of the invention, the solitons are emitted in the working data bandwidth of the optical data transmission system.

It is also possible for the solitons to be emitted outside the working data bandwidth of the optical data transmission system.

BRIEF DESCRIPTION OF THE DRAWINGS

Other characteristics and advantages of the invention appear on reading the following description of embodiments of the invention, given by way of example and with reference to the accompanying drawings, in which.

MORE DETAILED DESCRIPTION

FIGS. 1A, 1B, 1C, and 1D show examples of signals on various channels of a soliton transmission system using the invention. Typically such a soliton transmission system comprises emitter means connected to an optical fiber having amplifiers and/or filters disposed thereon at regular intervals.

Figure 1A:
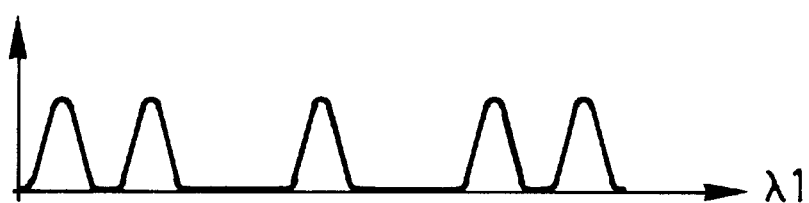
FIGS. 1A, 1B, 1C, and 1D show examples of signals on various channels of a soliton transmission system using the invention.
Figure 1B:
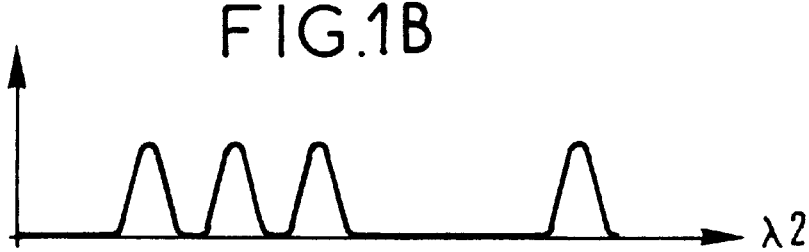
Figure 1C:
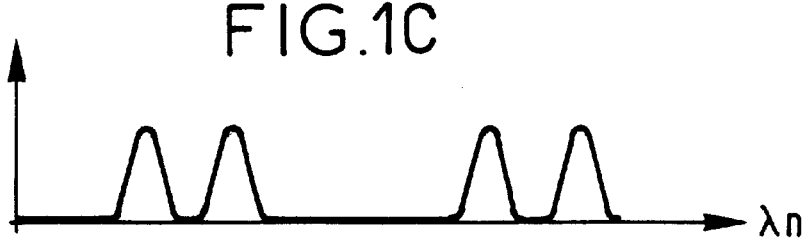

As already known, the working bandwidth of an optical fiber for soliton transmission is subdivided into a plurality of channels for transmitting different signals $\lambda_1$, to $\lambda_n$, each constituted by solitons corresponding to bits at logic value one and blanks corresponding to logic value zero. FIGS. 1A, 1B, and 1C show the appearance of these signals at three wavelengths $\lambda_1$, $\lambda_2$, and $\lambda_n$, respectively, with amplitude being plotted up the ordinate and time along the abscissa.

Figure 1D:
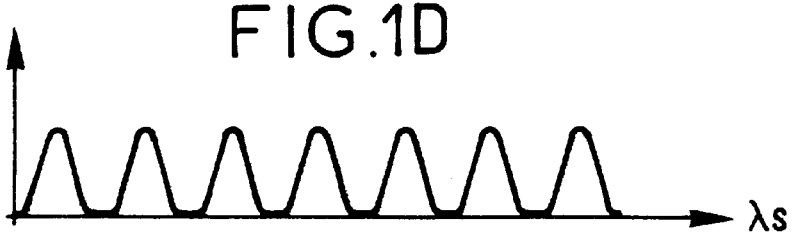

In addition to these various signals, the invention also proposes transmitting a signal $\lambda_s$ as shown in FIG. 1D, constituted by an uninterrupted run of solitons emitted at a clock frequency to be transmitted in the system or at the bit rate of the transmission system, and of a width such that interaction between solitons compensates the jitter induced by the Gordon-Haus effect. Because the solitons are transmitted in the form of an uninterrupted run, each soliton having any tendency to deform is pushed back by its interaction with adjacent solitons, thereby opposing deformation of the signal.

It is possible to emit a series of solitons in phase, making use of the attractive interaction between adjacent solitons; alternatively, it is possible to emit a series of solitons in phase opposition, using O-p modulation, making use of the repulsive interaction between adjacent solitons.

The invention thus overcomes the prejudice of the prior art as to the negative effects of interaction between solitons. It goes against the teaching of the state of the art by proposing to make use of the interaction between solitons to overcome deformation of the signal in the fiber, and in particular to correct the jitter induced by the Gordon-Haus effect.

Using the conventional definition of the "width" (FWHM) of a soliton pulse, the invention proposes that the width of each soliton should lie in the range 0.20 times to 0.33 times the period of solitons in the signal. The word "period" is used herein for the power envelope, independently of any changes of sign in the field that may be used with solitons in phase opposition. The lower limit of this preferred range makes it possible to ensure that the solitons of the signal interact sufficiently to compensate jitter due to the Gordon-Haus effect and do not behave like isolated solitons in known transmission systems. The upper limit of this range makes it possible to ensure that the transmitted signals conserve their soliton nature in spite of the interaction between adjacent solitons, thereby enabling the stability of the signal to be conserved in non-linear propagation.

The signal of the invention behaves like a run of solitons, and therefore passes through all of the passive elements that may be disposed on a fiber, such as guiding filters, etc.

The signal of the invention can be transmitted for various applications. The following can be mentioned by way of example:

in-line control of a synchronous modulator for regenerating solitons;

in-line synchronization of an active component such as a wavelength converter;

in-line control of demultiplexing; and carrying a clock signal.

Use of the signal of the invention makes it possible to distribute a clock in a soliton transmission system, or merely to transmit a clock from one point in the system to another.

It has the following advantages over apparatuses and methods known in the prior art. Firstly, the clock formed by the signal of the invention has greater spectral purity, or lower radiofrequency phase noise, than do clocks obtained in conventional manner from pseudo-random pulse trains. For bit rates of the order of 1 Gbit/s to 10 Gbit/s, the signal of the invention constitutes a clock having a spectrum width of a few hundreds of hertz. By way of comparison, a clock derived in conventional manner from pseudo-random pulse trains typically has a spectrum width that is greater than 1 MHz. Also, the signal of the invention makes it possible to use an optical clock directly, without any prior transformation or processing. Such direct use of the clock makes it possible to envisage operating at very high bit rates, such a 100 Gbit/s, at which conventional clock recovery methods present great difficulties.

As will appear immediately to the person skilled in the art, it is possible to transmit the signal of the invention in one of the channels in the working bandwidth. In addition, because the signal is robust as can be seen clearly from the description of FIG. 2, and because the structure of the signal is known in advance, it is also possible to use the edges of the working band normally used with solitons. Attenuations that would be too great for conventional data signals remain acceptable for the signal of the invention. The phase information of the solitons is more important than their intensity. It is thus possible to accept poorer transmission gain performance than for a conventional soliton signal.

The invention proposes not only a signal constituted by an uninterrupted run of solitons, such as the signal $\lambda_s$ as shown in FIG. 1D, it also proposes transmitting the inverse signal, i.e. a signal having black solitons emitted at a clock frequency to be transmitted in the system, and of a width such that the interaction between the solitons compensates the limiting effects of the jitter induced by the Gordon-Haus effect. Such a continuous signal with pulse holes forming black solitons presents the advantage of being capable of being transmitted in the portion of the optical fiber that has normal dispersion. This avoids the need to transmit the signal of the invention in the band that is of use for transmitting solitons, or even at the edges of that band.

Figure 2:
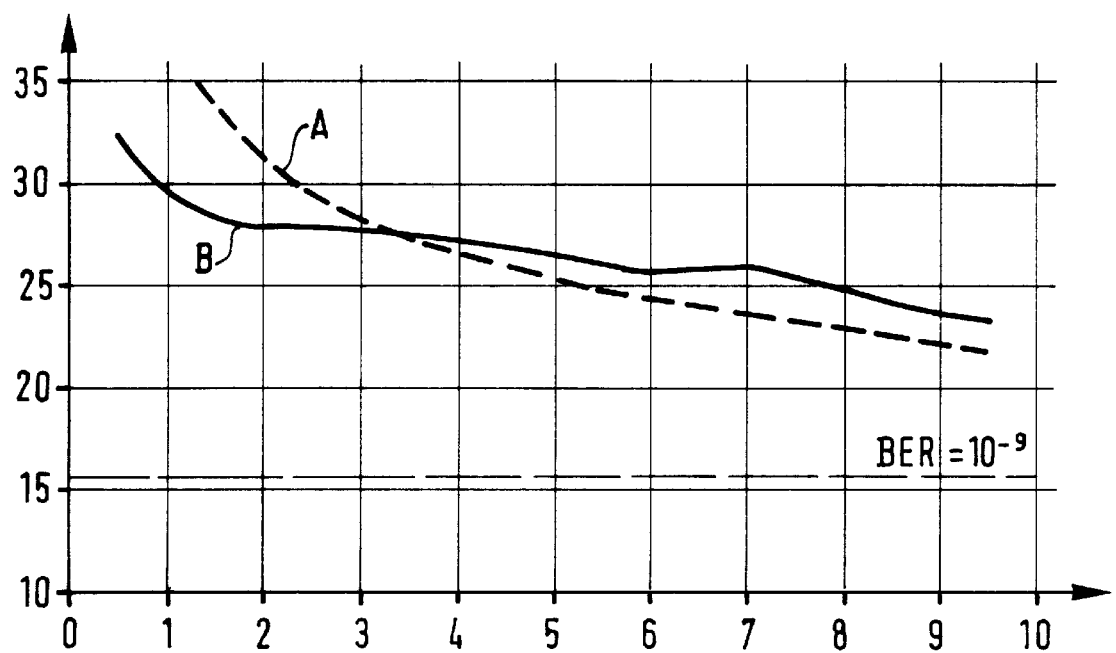
FIG. 2 is a graph showing Q-factor as a function of distance z, for a signal of the invention.

FIG. 2 is a graph of Q-factor Q as a function of distance z for a signal of the invention. The digital simulation of FIG. 2 is based on a train of solitons emitted at a rate of 10 Gbit/s, i.e. having a period of 100 ps, into a fiber of dispersion D=0.55 ps/nm.km. Each soliton was of width 30 ps, i.e. 0.3 times the soliton period. The solitons were modulated by O-p modulation, which corresponds to interaction that is repulsive. Guiding filters were disposed on the fiber at an interval Zn=50 km. The propagation distance is plotted along the abscissa in Mm, and the Q-factor is plotted up the ordinate in dB. In addition, a bit error rate (BER) of $10^{-9}$ is marked on the ordinate, corresponding to a Q-factor of about 15 dB.

Curve B shows the amplitude Q-factor $Q_a$ and curve A shows the time Q-factor $Q_t$, as computed digitally from the non-linear Schrddinger equation. Both of these factors have a value greater than 20 dB for propagation distances of 10 Mm, thus ensuring a BER that is considerably smaller than $10^{-9}$.

FIG. 2 shows clearly that the signal of the invention is robust, and confirms that making use of interaction between solitons, against the teaching of the prior art, makes it possible to compensate for the jitter induced by the Gordon-Haus effect.

Figure 3:
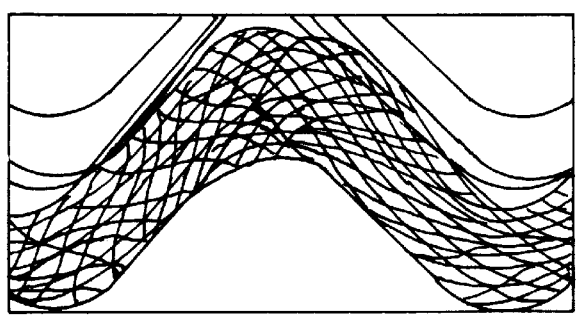
FIG. 3 shows the appearance of the eye diagram for the signal of FIG. 2, at a propagation distance of 10 Mm.

FIG. 3 shows the appearance of the eye diagram for the FIG. 2 signal for propagation over 10 Mm. The opening of the diagram shows the transmission quality of the signal of the invention.

Naturally, the present invention is not limited to the examples and embodiments described and shown, and the person skilled in the art is capable of varying it in numerous ways. In particular, an "uninterrupted" run of solitons does not mean a run of solitons having a number of solitons that is infinite, but merely that is large enough to restrict deformations to the ends of the run. It is clear that jitter compensation on a soliton by its interaction with adjacent solitons is not as effective at the beginning or at the end of transmission of the signal as it is in the middle of such transmission. The number of solitons required for a given transmission system can be determined by the person skilled in the art merely by routine testing. It is also clear that the bit rate of the signal of the invention can be different from the bit rate of the data channels in the optical fiber, and can, for example, be a multiple or a sub-multiple of said bit rate.

What is claimed is:

1. A method of generating an optical clock signal in an optical data transmission system, said method comprising the steps of:

generating an uninterrupted periodic series of solitons, each having a time width lying in the range 0.20 times to 0.33 times the period of the signal; and emitting said series of solitons as said optical clock signal.

2. A method according to claim 1, wherein the solitons are black solitons.

3. A method according to claim 1, further including O-p modulation of the emitted solitons.

4. A method according to claim 1, wherein the solitons are emitted in the working data band of the optical data transmission system.

5. A method according to claim 1, wherein the solitons are emitted outside the working data band of the optical data transmission system.

6. A method according to claim 1, wherein adjacent solitons are emitted in phase.

7. A method according to claim 1, wherein adjacent solitons are emitted in phase.

8. An optical data transmission system comprising:

an optical transmission medium; and a signal emitter emitting an optical signal into said medium comprising a periodic series of solitons, each soliton having a time width lying in the range 0.20 times to 0.33 times the period of the signal.

9. A system according to claim 8, wherein said signal comprises a clock signal.

10. An apparatus for transmitting an optical signal, said apparatus comprising an optical signal generator which generates an optical signal including a periodic series of solitons, each soliton having a time width lying in the range 0.20 times to 0.33 times the period of the signal, and a transmitter for transmitting the generated optical signal.

11. An apparatus according to claim 10, wherein the solitons are black solitons.

12. An apparatus according to claim 10, wherein adjacent solitons are in phase.

13. An apparatus according to claim 10, wherein adjacent solitons are in phase opposition.

14. An apparatus according to claim 10, wherein said optical signal carries a clock signal.

* * * * *